June 8, 1937.  G. M. PALMER  2,083,085

VEHICLE AXLE

Filed July 29, 1936  2 Sheets-Sheet 1

INVENTOR
G. M. Palmer.
By Lacey & Lacey,
Attys

June 8, 1937.  G. M. PALMER  2,083,085
VEHICLE AXLE
Filed July 29, 1936   2 Sheets-Sheet 2
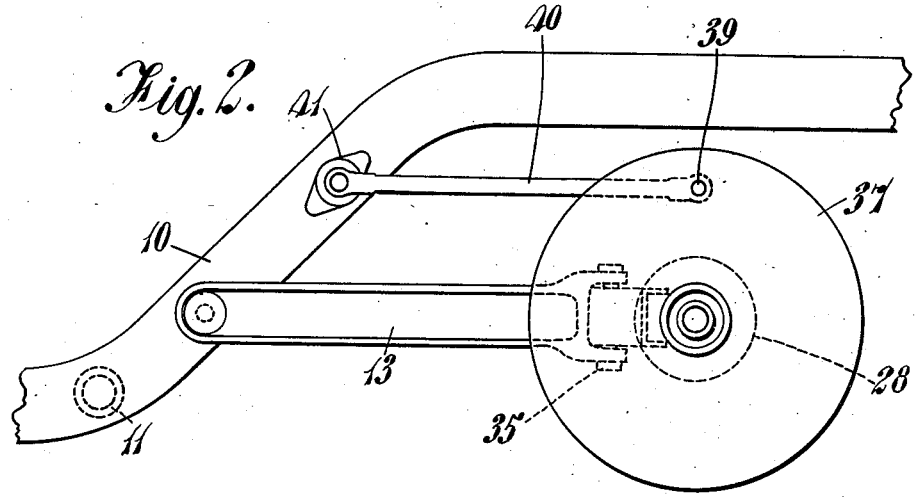
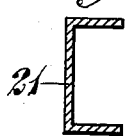
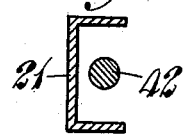
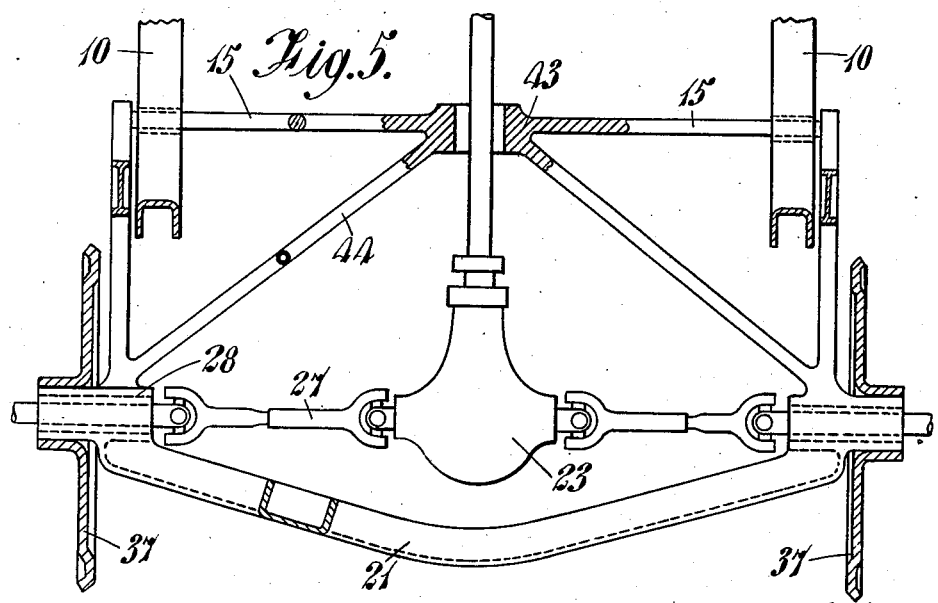
INVENTOR
G. M. Palmer.
By Lacey & Lacey, Attys Patented June 8, 1937

2,083,085

UNITED STATES PATENT OFFICE 2,083,085

VEHICLE AXLE

Gerald Marley Palmer, Northwood, England

Application July 29, 1936, Serial No. 93,269
In Great Britain July 30, 1935

14 Claims. (Cl. 180—73)

This invention relates to wheel springing for motor vehicles, and it has for its object to provide an improved general arrangement and construction of axle assembly which is particularly convenient where the associated wheels are to be mechanically driven from an engine. Thus, the invention is more especially applicable in the ordinary way to rear axles, although it is quite suitable for the leading wheels of a vehicle where front wheel drive is employed.

Regarded broadly, the invention consists in the employment of a transverse member connecting together a pair of wheels which are themselves provided with independent springs, said member being so constructed that its resistance to bending is sufficient to maintain the wheels in parallel planes, the resistance to torsion, however, being low enough to enable the transverse member to act as a torsion stabilizer.

The invention may advantageously be used in connection with wheel springing in which the pivots of the wheels themselves are carried on substantially horizontal spring-influenced arms adapted to resist in a resilient manner the downwardly acting load comprising the weight of the vehicle body and its occupants. The resilient means are preferably in the form of torsion rods.

The invention is illustrated by way of example in the accompanying diagrammatic drawings in which Figure 1 is a fragmentary plan showing one construction of wheel springing means;

Figure 2 is a side elevation of the parts shown in Figure 1;

Figure 3 is a section taken on the line 3—3 of Figure 1;

Figure 4 is a similar view showing a modified form of transverse member; and

Figure 5 is a fragmentary plan showing a modified form of transverse member.

Figure 1:
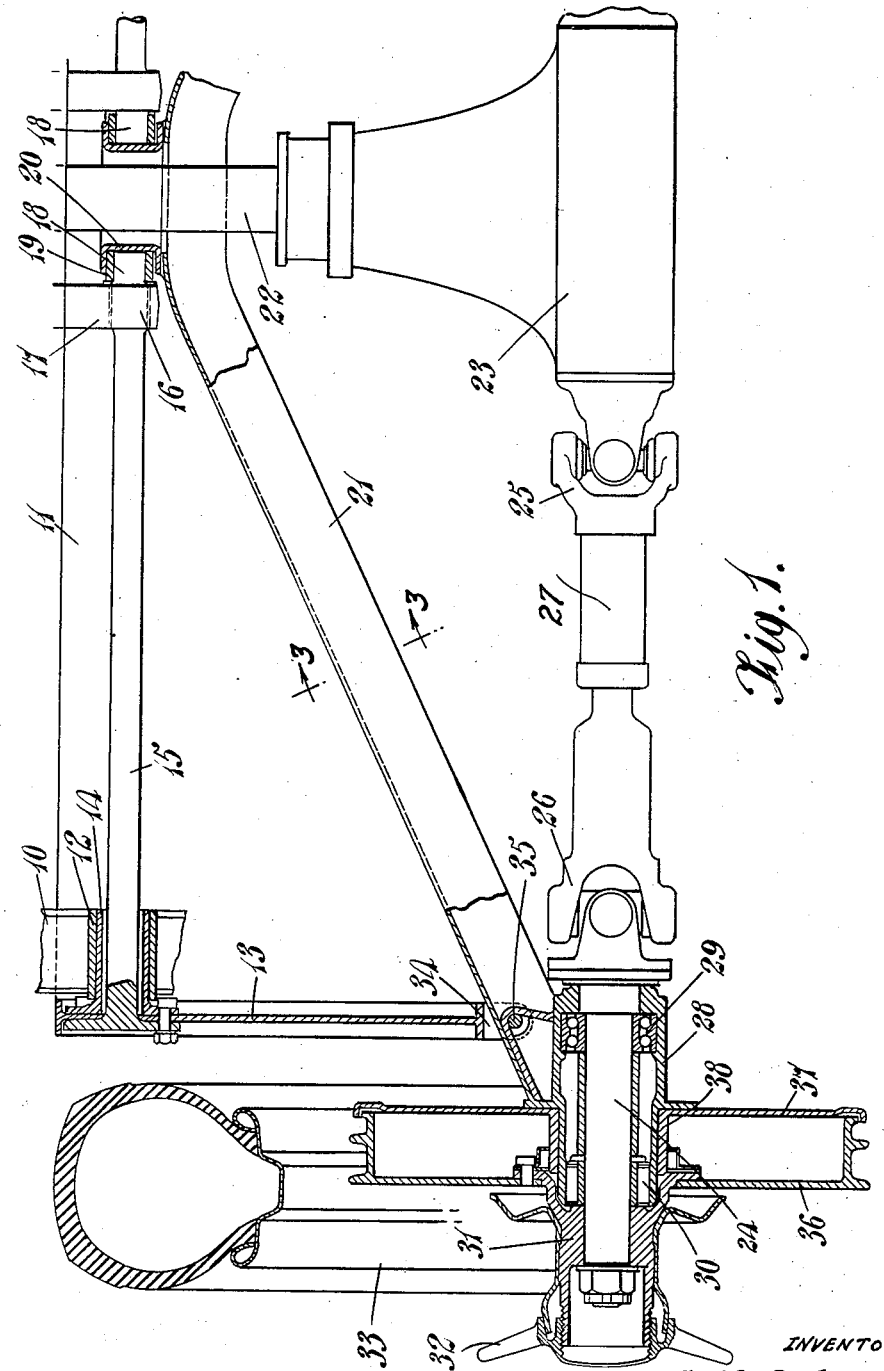

In Figures 1 and 2, one of the side members of the usual motor vehicle chassis is indicated at 10, and is braced to the opposite side member (not shown) by means of a tubular stay 11. The side member 10 is further provided with a bush 12 serving as the pivotal mounting for an arm 13 of I cross-section, said arm being fitted with a tubular pivot 14 for this purpose. A torsion spring 15, in the form of a cylindrical rod, is secured to the arm 13 at its outer end, while its inner end is anchored at 16 to a bracket 17 upon the tubular stay 11. Beyond its anchorage the torsion spring 15 is provided with a spigot 18 for the pivotal support of a ring-like fitting 19. This in turn carries a tubular eye 20 which is secured fast to the centre part of a substantially V-shaped transverse member 21. This construction enables the usual propeller shaft of the vehicle, indicated at 22, to extend through the eye 20 to a differential or other final drive unit 23 which is carried by the chassis or the body of the vehicle.

The drive from the unit 23 to the two wheel mountings, one of which is shown at 24, comprises a pair of universal joints 25 and 26 having a telescopically slidable connection 27 between them.

In accordance with the usual practice the wheel mounting 24 is rotatably carried within a stationary housing 28 by means of suitable bearings, such as a ball race 29 and a roller bearing 30. At its outer end the wheel mounting or shaft 24 is fitted with a hub 31 in any suitable manner, a nut 32 being provided in the example shown in order to allow the wheel 33 to be readily removed when desired.

The stationary housing 28 is securely fastened to the corresponding end of the transverse member 21 and is also rigidly attached to the free end 34 of the arm 13, as for example by means of a bolt 35, so that as the weight of the vehicle is taken by the wheel the arm 13 is caused to move upwardly thus inducing a torsion stress in the spring member 15. The transverse member 21 is of thin but deep channel cross-section as shown in Figure 3, and as a consequence it is particularly resistant to bending, although it can be twisted relatively easily. It, therefore, serves to maintain the two wheel housings 28 in substantially parallel relationship without interfering to any great extent with their independent springing movement. They are not, however, entirely free from one another, since an upward movement of one wheel brings about a twisting in the transverse member 21, and this has a stabilizing action which tends to prevent the vehicle chassis and body from developing a "rolling" motion.

A brake drum 36 is rotatable with the hub 31, while the usual backing plate of the brake assembly, indicated at 37, is also mounted so that it can move angularly in relation to the housing 28, said backing plate being fitted with a tubular bush 38 for this purpose. In order to absorb the brake reaction torque the backing plate 37 is coupled at 39 with the arm 40 of a shock absorber 41 carried on the chassis member 10, so that, although during springing movement the housing 28 executes a slight angular movement owing to its being mounted upon the arm 13, the backing plate 37 only moves vertically, and is at all times prevented from rotating owing to the presence of the shock absorber arm 40.

It will be appreciated that the transverse member 21 may be of any suitable form in order to provide the desired characteristics of resistance to bending and torsion, and in one modification shown in Figure 4 a bar 42 is associated with the transverse member 21 for the purpose of increasing its resistance to torsion, said bar 42 being, of course, connected at intervals with the member 21 or else at its ends only. Further, the transverse member 21 may be disposed in the rear of the final drive unit 23, as will be seen from Figure 5, where the transverse member 21 is again connected rigidly to the housings 28. The general construction is the same as before, a pair of torsion springs 15 being provided, but these are anchored at their inner ends to a ring-fitting which is secured to the chassis or body of the vehicle. In order to prevent lateral movement of the wheels a pair of diagonal stays 44 is provided, these, in the form shown, being composed of comparatively light tubing which is rigidly secured to the housing 28 at one end and the fitting 43 at the other.

It will be readily apparent that the desired relationship between the resistance to vertical bending and the resistance to axial torsion of the dead axle can be obtained by various forms of cross-section, said axle, if desired, being composed of a plurality of members so as to obtain the desired characteristics. Thus, for example, practically the whole of the resistance to bending may be produced by having a comparatively deep member of channel cross-section arranged with the web portion vertical, and if it is found that with such a construction the torsional resistance is insufficient, this can be augmented by including also an auxiliary stay, such as a tube or rod.

What I claim is:—

1. In a motor vehicle, wheel suspension means comprising a transverse member which is strong in resistance to bending and relatively weak in torsional resistance; and a pair of independently sprung wheel mountings, secured one upon each end of the transverse member and maintained in alignment thereby, said transverse member thus serving to preserve the alignment of the wheels, and at the same time act as a torsion stabilizer.

2. In a motor vehicle, wheel suspension means comprising a transverse member; mutually independent springing means at each end thereof; a wheel mounting at each end of the transverse member; and driving means connected with each of said wheels entirely independently of the transverse member, said transverse member being strong in bending resistance so as to maintain the axes of the wheel mountings substantially parallel and at the same time being relatively weak in torsional resistance so as to act as a torsion stabilizer.

3. In a motor vehicle, wheel suspension means comprising a transverse member which is strong in resistance to bending and relatively weak in torsional resistance; two independent springing means acting one on each end of the transverse member; a wheel mounting on each end of the transverse member, said wheel mountings being maintained in substantial parallelism by the transverse member; and driving means connected with the respective wheel mountings and acting entirely independently of the aforesaid transverse member.

4. In a motor vehicle, wheel suspension means comprising a transverse member which is strong in resistance to bending and relatively weak in torsional resistance; two independent springing means acting one on each end of the transverse member and consisting of a transversely disposed spring member acting in torsion, with an arm connected with its outer end, that part of the spring member adjacent the centre line of the vehicle being anchored; a wheel mounting on each end of the transverse member, said wheel mountings being maintained in substantial parallelism by the transverse member; and driving means connected with the respective wheel mountings and acting entirely independently of the aforesaid transverse member.

5. In a motor vehicle, wheel suspension means comprising a transverse member which is strong in resistance to bending and relatively weak in torsional resistance, the centre part of said transverse member being anchored to the vehicle; two independent springing means acting one on each end of the transverse member; a wheel mounting on each end of the transverse member, said wheel mountings being maintained in substantial parallelism by the transverse member; and driving means connected with the respective wheel mountings and acting entirely independently of the aforesaid transverse member.

6. In a motor vehicle, wheel suspension means comprising a transverse member which is strong in resistance to bending and relatively weak in torsional resistance; two independent springing means operating one on each side of the transverse member and consisting of a transversely disposed spring member acting in torsion, with an arm connected with its outer end, that part of the spring member adjacent the centre line of the vehicle being anchored, and that end of each arm remote from the spring member being secured to the corresponding end of the transverse member; a wheel mounting on each end of the transverse member, said wheel mountings being maintained in substantial parallelism by the transverse member; and driving means connected with the respective wheel mountings and acting entirely independently of the aforesaid transverse member.

7. In a motor vehicle, wheel suspension means comprising a transverse member which is strong in resistance to bending and relatively weak in torsional resistance; two independent springing means acting one on each end of the transverse member; a wheel mounting on each end of the transverse member, said wheel mountings being maintained in substantial parallelism by the transverse member; driving means connected with the respective wheel mountings and acting entirely independently of the aforesaid transverse member; and anchorage means securing the centre part of the transverse member to the vehicle, said anchorage means being arranged to permit rotational adjustment of said member about an axis extending substantially parallel with the longitudinal axis of the vehicle.

8. In a motor vehicle, wheel suspension means comprising a transverse member which is strong in resistance to bending and relatively weak in torsional resistance; two independent springing means operating one on each side of the transverse member and consisting of a transversely disposed spring member acting in torsion, with an arm connected with its outer end, that part of the spring member adjacent the centre line of the vehicle being anchored, and that end of each arm remote from the spring member being secured to the corresponding end of the transverse member; a wheel mounting on each end of the transverse member, said wheel mountings being maintained in substantial parallelism by the transverse member; driving means connected with the respective wheel mountings and acting entirely independently of the aforesaid transverse member; a brake assembly carried on each wheel mounting; and means for resisting the brake reaction, said means being secured to the brake assembly at a position displaced from the attachment of the corresponding arm.

9. In a motor vehicle, wheel suspension means as claimed in claim 8, in which a shock absorber arm is connected with the brake assembly at a position remote from the attachment of the corresponding arm, so that the brake assembly is constrained to move only in a substantially vertical direction.

10. In a motor vehicle, wheel suspension means comprising a transverse member which is strong in resistance to bending and relatively weak in torsional resistance; a vehicle chassis; two independent springing means acting one on each end of the transverse member; a wheel mounting on each end of the transverse member, said wheel mountings being maintained in substantial parallelism by the transverse member; driving means connected with the respective wheel mountings and acting entirely independently of the aforesaid transverse member; and diagonal bracing means connecting both ends of the transverse member with the vehicle chassis.

11. In a motor vehicle, wheel suspension means as claimed in claim 1, in which the transverse member is of channel shape cross section.

12. In a motor vehicle, wheel suspension means as claimed in claim 1, in which the transverse member comprises a plurality of elements arranged alongside one another to provide the requisite characteristics of bending and torsional resistance.

13. In a motor vehicle, wheel suspension means comprising a pair of transverse torsion rods; an arm at the outer end of each of said rods; a wheel mounting carried by the end of said arm; a transverse member joining the wheel mountings and rigidly secured at its ends to the two arms, said transverse member being sufficiently resistant to bending to maintain the wheel mountings in parallelism, yet capable of twisting so as to serve as a torsion stabilizer; and driving means independent of the transverse member connected operatively with the two wheel mountings.

14. In a motor vehicle, wheel suspension means comprising a pair of transverse torsion rods; an arm at the outer end of each of said rods; a wheel mounting carried by the end of said arm; a transverse member joining the wheel mountings and rigidly secured at its ends to the two arms, said transverse member being sufficiently resistant to bending to maintain the wheel mountings in parallelism, yet capable of twisting so as to serve as a torsion stabilizer; a ring-like anchorage at the centre of the transverse member; and driving means passing through said anchorage and connected operatively with the wheel mountings.

GERALD MARLEY PALMER.